(12) United States Patent
Benhamou et al.

(10) Patent No.: US 8,392,755 B2
(45) Date of Patent: Mar. 5, 2013

(54) PROVIDING PROTECTION SWITCHING VIA FAILURE PREDICTION

(75) Inventors: Leon Benhamou, Kanata (CA); Michael Mei, Nepean (CA); Randy Law, Surrey (CA)

(73) Assignee: Alcatel Lucent, Paris (FR)

( * ) Notice: Subject to any disclaimer, the term of this patent is extended or adjusted under 35 U.S.C. 154(b) by 169 days.

(21) Appl. No.: 10/667,722

(22) Filed: Sep. 22, 2003

(65) Prior Publication Data

US 2005/0066221 A1    Mar. 24, 2005

(51) Int. Cl.
*G06F 11/00* (2006.01)
(52) U.S. Cl. ............................. 714/13; 714/15
(58) Field of Classification Search ................. 714/5–7, 714/13, 15, 47, 41
See application file for complete search history.

(56) References Cited

U.S. PATENT DOCUMENTS

| | | | | |
|---|---|---|---|---|
| 4,245,342 | A * | 1/1981 | Entenman | 340/825.01 |
| 4,769,761 | A * | 9/1988 | Downes et al. | 709/224 |
| 5,715,386 | A * | 2/1998 | Fulton et al. | 714/38 |
| 5,764,651 | A | 6/1998 | Bullock et al. | |
| 6,594,784 | B1 * | 7/2003 | Harper et al. | 714/47 |
| 6,629,266 | B1 * | 9/2003 | Harper et al. | 714/38 |
| 6,771,440 | B2 * | 8/2004 | Smith | 360/31 |
| 6,886,108 | B2 * | 4/2005 | Talagala | 714/5 |
| 6,978,398 | B2 * | 12/2005 | Harper et al. | 714/13 |
| 2003/0120983 | A1 | 6/2003 | Vieregge et al. | |

FOREIGN PATENT DOCUMENTS

WO    WO 01/20829 A1    3/2001

OTHER PUBLICATIONS

Rathgeb, EP: "The MainStreetXpress 31690: a scalable and highly reliable ATM core services switch", Computer Networks, Elsevier Science Publishers B.V., Amsterdam, NL, Mar. 25, 1999, pp. 583-601, vol. 3, No. 6.

Sharma, V. et al., "Framework for MPLS-based Recovery", IETF Draft Multiprotocol Label Switching, Mar. 2001, pp. 1-33.

* cited by examiner

*Primary Examiner* — Christopher McCarthy
(74) *Attorney, Agent, or Firm* — Ross D. Snyder & Associates, Inc.

(57) ABSTRACT

In accordance with at least one embodiment of the disclosures made herein, monitoring a failure prediction parameter of at least one of the plurality of protected system elements is performed. correlating a present state of the failure prediction parameter to a failure prediction criterion is performed, thus identifying a failure predicted one of a plurality of protected system elements when a failure prediction condition is met. In response to determining protection switching priority as applying to the failure predicted one or the failure predicted one being the only failure predicted system element, downloading service information of the failure predicted one to the protection system element is performed. Failure of the failure predicted one is confirmed. Switching communication service supported by the failure predicted one of the protected system elements for being supported by to the protection system element is performed.

50 Claims, 5 Drawing Sheets

PROVIDING PROTECTION SWITCHING VIA FAILURE PREDICTION

BACKGROUND OF THE INVENTION

In Automated Protection Switching (APS) schemes, a protection system including a single protection card provides protection for a plurality (i.e., N) of protected cards. In the case of a failed protected card, a protection switch requires that the protection card be downloaded with service data (e.g., call data) of the failed protected card before the protection card is fully brought into service. Downloading such service data can take up to as much as a few minutes or more depending on the amount of service data.

In the case of a fault, it is not usually known which one of the plurality of protected cards will require replacement. Therefore, it is not possible to download the service data to the protection card before a protection switch occurs. Consequently, services supported by the failed protected card will be adversely affected while the service data is being downloaded to the protection card.

During upgrade and maintenance of one of a plurality of the protected cards, the protection card may be used to back up the protected card being serviced. During such upgrade or service, a subscriber (i.e., a customer) will typically be adversely affected (e.g., by a disruption in service) for as much as several minutes as the protection card is downloaded with service data from the protected card being upgraded or maintained. Furthermore, during upgrade and maintenance, it is generally known which one of the protected cards will be replaced temporarily by the protection card. However, in conventional APS implementations, such knowledge of which one of the protected cards will be replaced temporarily by the protection card is not used to minimize the adverse effects associated with a service-affecting period resulting from the upgrade or maintenance. For voice calls, the service-affecting period during which the service data is being downloaded is often unacceptably long.

Conventional solutions for providing card protection exhibit one or more limitations. A first conventional solution for providing card protection is to overload one or more protection cards with connections for a plurality of protected cards. However, such an approach requires greatly increased memory capability to be provided on the protection cards. Limitations associated with the first conventional solution include the increased cost to implement it and the significant board space that it requires within a particular network apparatus. A second conventional solution is to use a 1:1 protection scheme such that a protection card is required for every protected card. Excessive cost is a key limitation of a 1:1 protection scheme.

Therefore, facilitating protection switching in a manner that overcomes limitations associated with conventional protection switching functionality is useful.

BRIEF DESCRIPTION OF THE SEVERAL VIEWS OF THE DRAWINGS

The present invention may be better understood, and its features made apparent to those skilled in the art by referencing the accompanying drawings.

The use of the same reference symbols in different drawings indicates similar or identical items.

DETAILED DESCRIPTION OF THE INVENTION

The disclosures made herein pertain to various aspects of utilizing failure prediction to enhance performance of a network system. By predicting failure of a system element (e.g., a line card), service data from such as failure predicted system element may be downloaded to a protection system element in advance of an actual failure of the failure predicted system element. Accordingly, the protection system element is ready and able to be brought inservice immediately upon a protection switch being deemed necessary, thereby minimizing or eliminating service disruptions resulting from performing protection switching. Rather than reacting to an actual failure, proactive actions are taken to efficiently and effectively respond to the failure should it occur.

Methods, apparatuses, systems and data processor program products in accordance with embodiments of the disclosures made herein apply to 1:1 automated protection switching (APS) and 1:N APS. In 1:1 switching applications, such embodiments provide for switching before an actual failure and avoid unnecessary downloading of data (i.e., thrashing of data back and forth) from one system element to the other. Unlike conventional 1:N APS techniques, APS techniques in accordance with the disclosures made herein provide for cost effective 1:N APS with minimal data being lost during protection switching. Furthermore, APS techniques in accordance with the disclosures made herein effectively and efficiently enable protection switching for fault conditions as well as maintenance and upgrade actions.

The definition of failure in the context of failure prediction and failure condition is defined herein to include that a system element is incapable of maintaining a minimum acceptable performance level. For example, a failure condition may be met when a system element is incapable of meeting one or more minimum accepted operational parameter. Thus, it is not necessary for a system element to be entire non-functional for the system element to be in a failed state.

Figure 1:
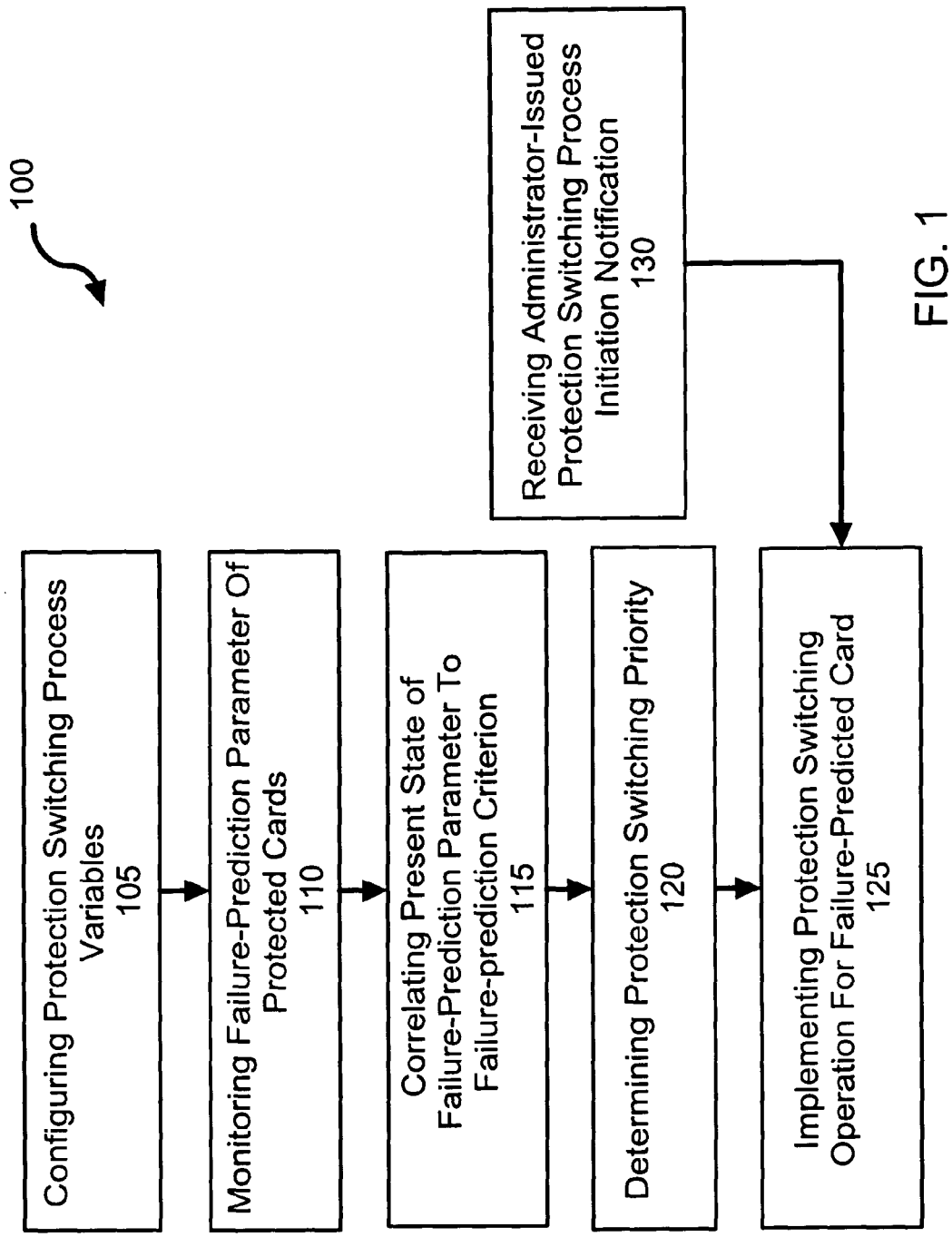
FIG. 1 is a flow chart view depicting a method for facilitating protection switching via failure prediction in accordance with an embodiment of the disclosures made herein.

Turning now to specific drawing figures, FIG. 1 depicts a method 100 for facilitating 1:N failure predicted automated protection switching in accordance with an embodiment of the disclosures made herein. An operation 105 is performed for configuring protection switching variables for a plurality of protected cards. After configuring the protection switching variables, an operation 110 is performed for monitoring a present condition of a failure prediction parameter of a plurality of protected cards and an operation 115 is performed for attempting to correlate the present state of the failure prediction parameter to a respective failure prediction criterion for determining that a failure prediction condition has been met by one of the protected cards (i.e., a failure predicted card).

Monitoring the present condition of the failure prediction parameter and attempting to correlate the present condition of the failure prediction parameter to the respective failure prediction criterion is an example of identifying the failure predicted card. Examples of the failure prediction parameter include an element demerit point value, a rate of change of the element demerit point value, an element demerit point value threshold limit, a number of active connections, a number of active service subscribers, a performance value specified in a respective service agreement, a data bit rate, a rate of change of the data bit rate and the like. Examples of a failure prediction criterion include a failure prediction parameter being above a predetermining level, an operating parameter being below a predetermined level, a failure prediction parameter achieving a predetermined level and the like.

In response to correlating the present state of the failure prediction parameter to a respective failure prediction criterion and when a plurality of failure predicted cards have been identified, an operation 120 is performed for determining a protection switching priority among the plurality of failure predicted cards. After determining the failure predicted card protection switching priority, an operation 125 is performed for implementing the protection switching (i.e., a protection switching operation) for the failure predicted one of the protected cards having priority.

The protection switching priority designates which one of a plurality of failure predicted cards (i.e., the designated failure predicted card) will be subjected next to a protection switching operation. In this manner, protection switching functionality can be implemented on a priority basis rather than a first-identified, first-served basis. It is contemplated herein, however, that in some instances protection switching functionality may be implemented expressly in a first-identified, first-served basis. It is also contemplated herein that the operation for determining the protection switching priority may be omitted when only one failure predicted car is identified.

An alternate means for initiating implementation of the protection switching operation 125 includes performing an operation 130 for receiving an administrator-issued protection switching initiation notification. In response to receiving the administrator-issued protection switching initiation notification, the operation 125 is performed for implementing a protection switching process. A protection switching operation implemented in response to receiving an administrator-issued protection switching initiation notification is defined herein as an administrator-initiated protection switching operation.

In one example of an administrator-initiated protection switching operation, a system administrator issues a protection switching initiation notification to manually initiate the protection switching operation for a failing protected card and/or for maintenance or upgrade purposes for a particular protected card. To this end, the system administrator utilizes a suitable user interface for issuing the protection switching initiation notification to inform the protected system that one or more of its protected cards is approaching a failure condition or that data of a particular card need to be switched to the protection card for facilitating maintenance or upgrade of the particular card. It is contemplated that the system administrator may explicitly ask for the protection switching to be activated and designating one or more particular cards, or may activate a predefined command such as a reset/maintenance command. This action results in the protection card being notified of an imminent protection switch, thereby initiating downloading of service data from the designated protected card to the protection card.

One or more of the steps of the method illustrated in FIG. 1 may be performed iteratively. As one example, the entire method may be performed iteratively. As another example, operations 110 and 115 may be performed iteratively. As another example, operations 110, 115, and 120 may be performed iteratively. As another example, operations 110, 115, 120, and 125 may be performed iteratively. As another example, operations 130 and 125 may be performed iteratively. One or more delays may be introduced within such iterations to avoid excessive processing activity and impairment of performance, or such iterations may occur without delay. Such delays may be implemented as explicit delays or as scheduling iterations to occur periodically or aperiodically.

Figure 2:
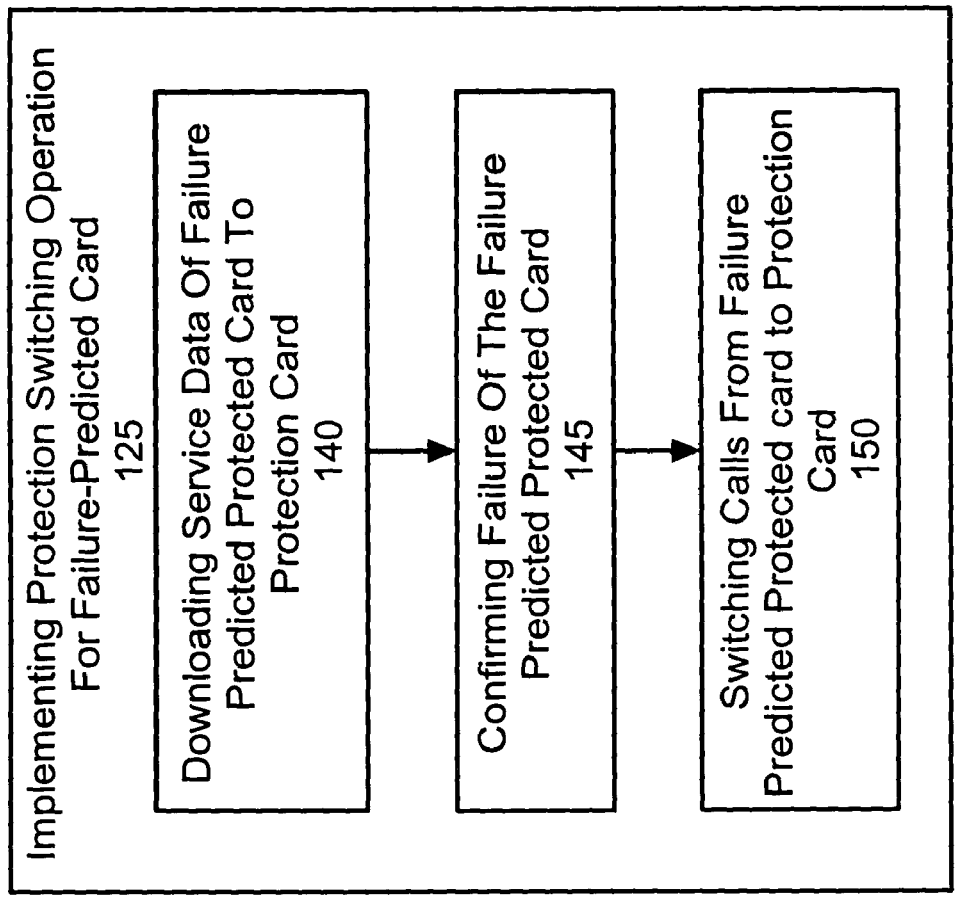
FIG. 2 is a block diagram depicting operations for implementing a protection switching operation for a failure predicted card in accordance with an embodiment of the disclosures herein.

FIG. 2 depicts an embodiment of the operation 125 for implementing the protection switching. As depicted, an operation 140 is performed for downloading service data of the designated failure predicted card to the protection card. After downloading the service data, an operation 145 is performed for confirming failure of the failure predicted card. In response to confirming failure of the designated failure predicted card, an operation 150 is performed for switching line communication (e.g., telephone calls, data communication and the like).

Switching of calls from the designated failure predicted card to the protection card does not take place until an actual failure condition has been confirmed. Accordingly, a protection switching operation implemented in response to confirming a failure condition is defined herein as a failure confirmed protection switching operation. Thus, operation 125 may be performed by performing one or more of operations 140, 145, and 150. For example, if an actual failure condition has not occurred, then the actual failure condition cannot be confirmed, so steps 145 and 150 may be omitted for that iteration in which the actual failure condition has not occurred. Moreover, multiple iterations of operations 140, 145, and 150 can occur. As an example, if a failed protected card whose traffic is being handled by the protection card recovers from its failure (e.g., the failed condition no longer exists, the failed protected card is tested to be free of the failed condition to an extent that satisfies a desired level of reliability, or the failed protected card is replaced with a replacement protected card), the traffic may be transferred from the protection card back to the protected card, and operations 140, 145, and 150 may be performed in relation to failure of a different failure predicted protected card. As another example, even when a failed protected card has not recovered from its failure, if a different protected card of higher protection switching priority were to fail, operations 140, 145, and 150 may be performed in relation to the different protected card of higher protection switching priority. In such an example, the ability to handle traffic of the lower protection switching priority failed protected card that first failed may be lost in favor of providing a continued ability to handle traffic of the higher protection switching priority different protected card via the protection card. For that reason, a provision for traffic of a higher protection switching priority protected card to preempt use of the protection card by a lower protection switching priority protected card should be carefully controlled to avoid undesirable loss of important traffic.

In one embodiment of method 100 for facilitating 1:N failure predicted automated protection switching, failure prediction parameter threshold limits are utilized for identifying failure predicted cards and for confirming failure of a failure predicted card. The failure prediction parameter may be an operating parameter of the protected cards or a parameter specifically intended for qualitatively assessing a probability of failure. Examples of operating parameters that may be used as a failure prediction parameter include a number of active connections, a number of active service subscribers, a data bit rate and a rate of change of the data bit rate. Examples of a parameter specifically intended for qualitatively assessing a probability of failure include a quantity of element demerit points and a rate of change of the element demerit points. It is contemplated herein that element demerit points may be based on one or more operating parameters of the protected cards.

Figure 3:
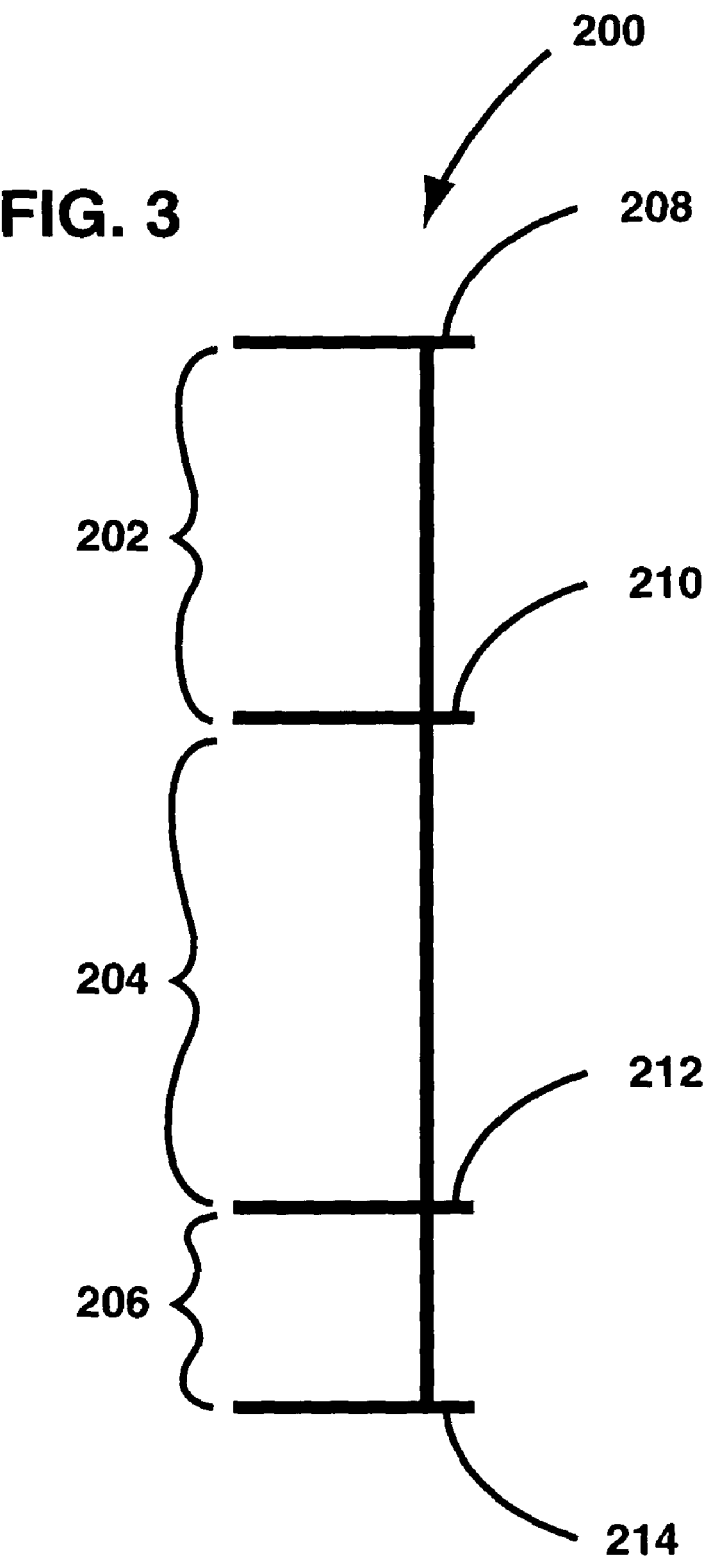
FIG. 3 is a diagrammatic view depicting a failure prediction parameter threshold limit scale in accordance with an embodiment of the disclosures made herein.

An embodiment of a failure prediction parameter threshold limit scale 200 is depicted in FIG. 3. The failure prediction parameter threshold limit scale 200 includes a normal operating range 202, a first alarm range 204 and a second alarm range 206. The normal operating range 202 is bound between a failure prediction parameter maximum level 208 (e.g., 100%) and a failure prediction parameter first threshold limit 210 (e.g., 55%). The first threshold alarm range 204 is bound between the failure prediction parameter first threshold limit 210 and a failure prediction parameter second threshold limit 212 (e.g., 30%). The second threshold alarm range 206 is bound between the failure prediction parameter second threshold limit 212 and a failure prediction parameter minimum level 214 (e.g., 0%).

One embodiment of identifying a failure predicted card includes determining that a failure prediction parameter associated with the one of the protected cards has breached the failure prediction parameter first threshold limit 210. Upon such a determination, preparations for protection switching may be made. For example, information pertaining to the one of the protected cards may be preloaded into the protection card. As another example, in a case where multiple protected cards have breached the failure prediction parameter first threshold limit 210, selection of a preferred protected card may be made. Such a selection may be based on the respective values of the failure prediction parameter for the multiple protected cards, the respective values of a protection switching priority parameter among the multiple protected cards, or a combination thereof. Thus, preparation for protection switching of a protected card predicted to be most likely to fail can be performed in advance of actual failure of such card, thereby decreasing the amount of time and processing activity required to transfer traffic from that protected card to the protection card in the event that such transfer is deemed appropriate. Moreover, by refraining from performing such preparation until a protected card has breached the failure prediction parameter first threshold 210, unnecessary processing activity in preparation of protection switching can be avoided when none of the protected cards appears to be at substantial risk of imminent failure, thereby improving performance.

Optionally, different failure prediction parameter first threshold limits 210 may be applied to different protected cards. Thus, for example, protected cards deemed to require higher reliability may be configured to correspond to more easily breached failure prediction parameter first threshold limits 210, while protected cards deemed to be suitable for a lower standard of protection may be configured to correspond to less easily breached failure prediction parameter first threshold limits 210.

Moreover, selection of a protected card for which information is to be preloaded into the protection card may be performed repeatedly. For example, as changes occur among values of a failure prediction parameter for several protected cards, the selection of a protected card as the prime candidate for protection switching may be revised such that a different protected card is then selected. The responsiveness to such changes may be adjusted such that sensitivity to such changes is sufficient to maintain a reasonable relationship between a failure prediction parameter and the selection of a protected card as the prime candidate for protection switching, yet not so sensitive as to result in undesirably frequent revision, which would involve substantial amounts of processing activity that could impair performance.

Similarly, one embodiment of confirming failure of the failure predicted card includes determining that the failure prediction parameter has breached the failure prediction parameter second threshold limit 212. Upon such a determination, actual transfer of traffic from the protected card for which the failure prediction parameter has breached the failure prediction parameter second threshold limit 212 to the protection card may be performed. For example, in the case where the protected card for which the value of the failure prediction parameter has breached the failure prediction parameter second threshold limit 212 is the same protected card selected for preparation for protection switching, transfer of traffic may be effected immediately, without the need for lengthy preparation processes to occur at the time a decision is made to effect the transfer of traffic. As another example, in the case where the protected card for which the value of the failure prediction parameter has breached the failure prediction parameter second threshold limit 212 is different from the protected card selected for preparation for protection switching, preparation for protection switching may be performed for the protected card for which the value of the failure prediction parameter has breached the failure prediction parameter second threshold limit 212 followed by transfer of traffic of that protected card to the protection card. Thus, transfer of traffic to a protection card from either a protected card that was previously selected for preparation for protection switching or a protected card that was not selected for preparation for protection switching may be accomplished, and substantially improved performance can be achieved in the case where the protected card was previously selected for preparation for protection switching.

Optionally, different failure prediction parameter second threshold limits 212 may be applied to different protected cards. Thus, for example, protected cards deemed to require higher reliability may be configured to correspond to more easily breached failure prediction parameter second threshold limits 212, while protected cards deemed to be suitable for a lower standard of protection may be configured to correspond to less easily breached failure prediction parameter second threshold limits 212.

Such a multi-threshold approach to identifying the failure predicted card and confirming failure of the failure predicted card enables protection switching to be achieved before an actual failure condition exists, yet avoids unnecessary downloading of data and/or unneeded switching of communication service from the failure predicted card to the protection card until the failure condition is deemed to be imminent. Accordingly, resources of the protected system are utilized more efficiently and effectively.

Figure 4:
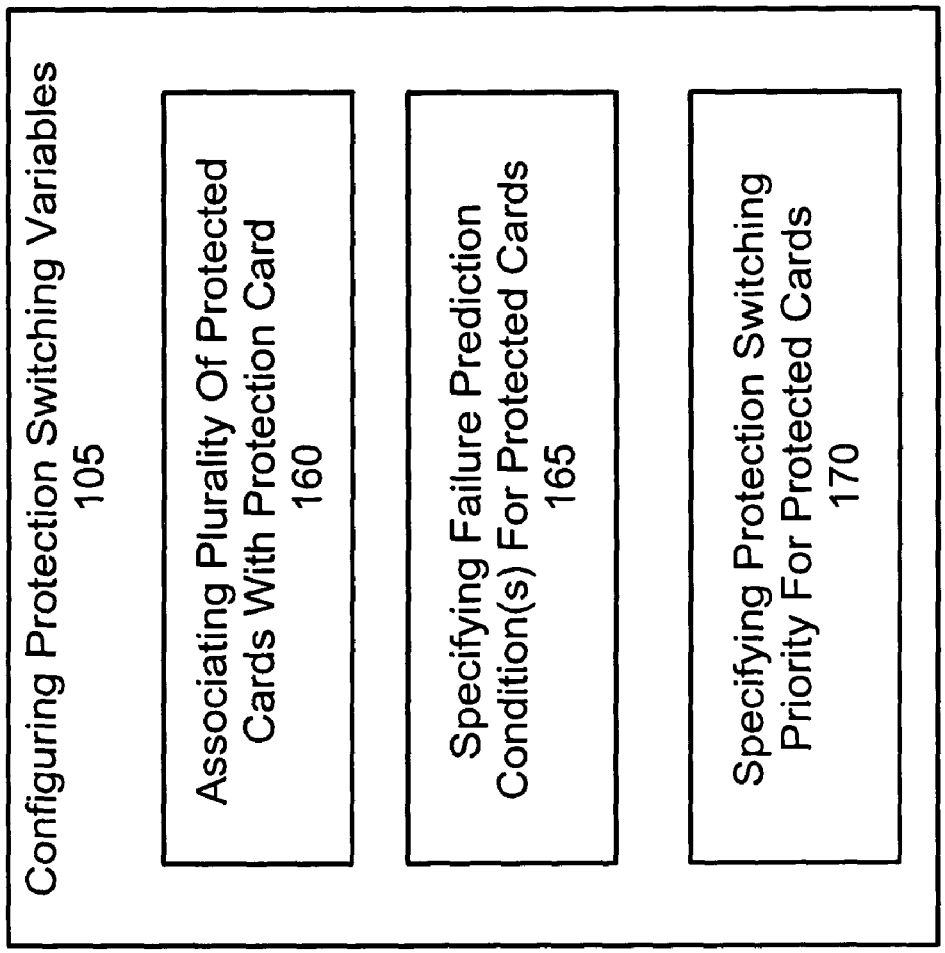
FIG. 4 is a flow chart view depicting operations for configuring protection switching variables in accordance with embodiments of the disclosures made herein.

As depicted in FIG. 4, one embodiment of the operation 105 for configuring protection switching process variables includes a step 160 for associating each one of plurality of protected cards with a protection card, a step 165 for specifying failure prediction criterion for each one of the predicted cards and a step 170 for specifying a protection switching priority the plurality of protected cards. For 1:N protection switching, each one of the protected cards is associated with a common protection card. For 1:1 protection switching, each one of the protected cards is associated with a respective one of a plurality of protection cards.

One embodiment of specifying the protection switching priority includes associating a protection switching priority parameter with each of one or more portions of the protected cards. Accordingly, protection switching priority parameters may be used for determining a protection switching priority among a collection of failure predicted cards. The failure predicted card having the highest priority, as designated by its protection switching priority parameter, is accorded protection switching before any other failure predicted card. Examples of a protection switching priority parameter includes a parameter relating to element demerit points, a parameter relating to a rate of change of said element demerit points, a parameter relating to an element demerit point threshold limit, a parameter relating to a number of active connections, a parameter relating to a number of active service subscribers, a parameter designated in a service agreement, a mounted position in a network element, an administrator-assigned priority value, a data bit rate, and rate of change of the data bit rate. A protection switching priority may be assigned in accordance with one or more protection switching priority parameters. Thus, one or more of several protected cards may be prioritized to optimize the utility of the failure prediction for protection switching.

One or more of operations 160, 165, and 170 may be performed iteratively. Such iterative performance of one or more of operations 160, 165, and 170 may be used to allow dynamic control of aspects of one or more methods in accordance with embodiments of the disclosures made herein. Thus, the applicability and utility of the failure prediction for protection switching may be optimized in light of changes in traffic over time.

Figure 5:
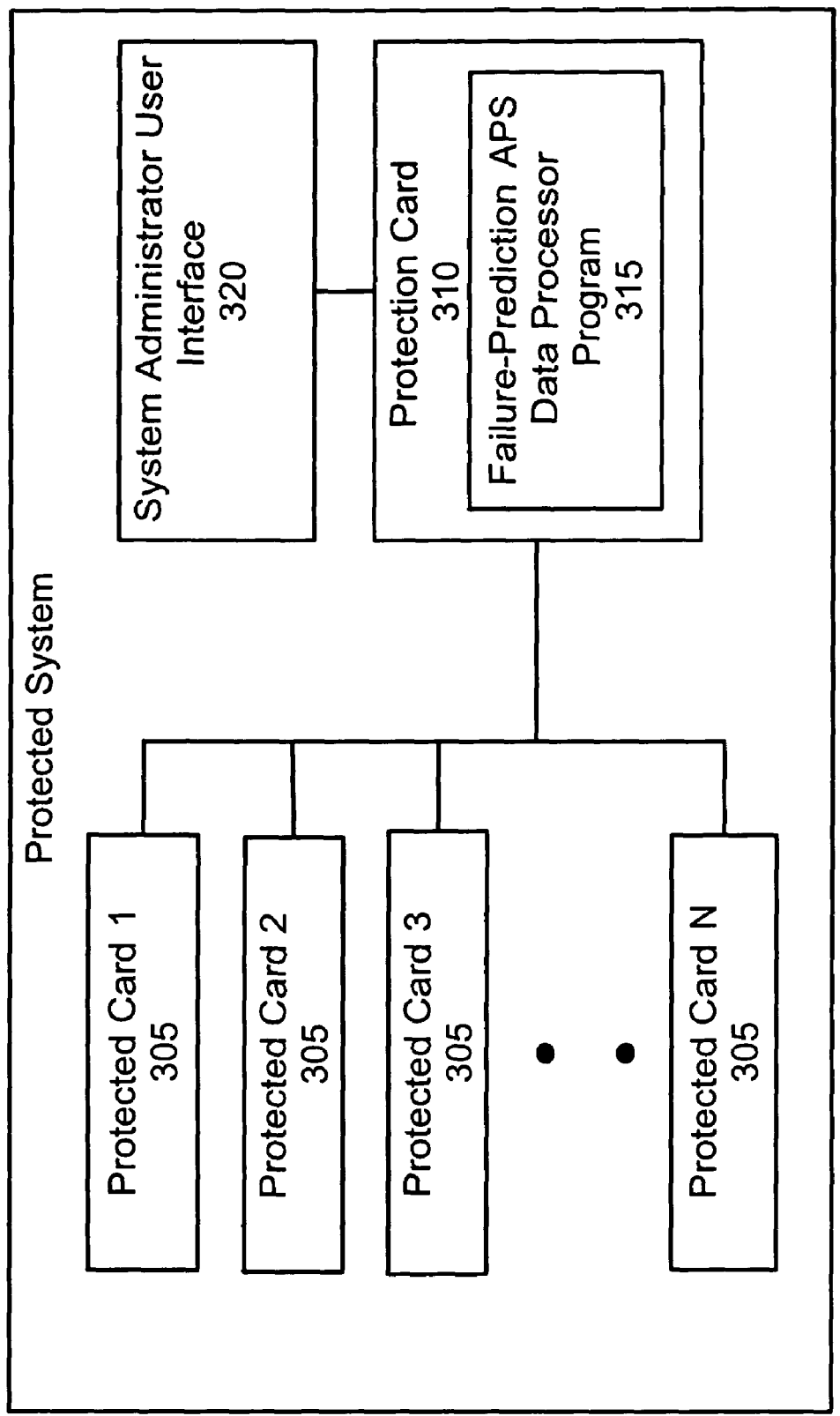
FIG. 5 is block diagram view depicting a protected system in accordance with an embodiment of the disclosures made herein.

FIG. 5 depicts a protected system 300 in accordance with a 1:N APS embodiment of the disclosures made herein and capable of carrying out the method 100. The protected system 300 includes a plurality of protected cards 305 connected to a protection card 310. Each one of the protected cards 305 is an example of a protected system element.

The protection card 310 is capable of facilitating failure predicted protection switching in accordance with embodiments of the disclosures made herein. The protection card 310 is an example of a protection system element. As depicted, the protection card 310 provides such failure predicted protection switching exclusively for all of the protected cards 305 (i.e., 1:N failure predicted APS). It is contemplated herein that in other embodiments of protection systems, the protection card 310 provides such failure predicted protection switching for a single protected card (i.e., 1:1 failure predicted APS).

A failure prediction APS data processor program 315 accessible by a data processor (not shown) of the protection card 310 at least partially enables and controls such failure predicted APS. As depicted, the failure predicted APS data processor program 315 resides on a suitable component (e.g., memory, not shown) of the protection card 310. In other embodiments of the protection card 310, the failure predicted APS data processor program is accessible by the protection card 310 via a remote location (e.g., a remote memory module). As another example, a control card separate from the protection card 310 may be used to perform the failure prediction APS data processor program 315. In such an example, the control card may be coupled to one or more of the protection card 310, the protected cards 305, and the system administrator user interface 320.

A system administrator user interface 320 is connected to the protection card 310. The system administrator user interface 320 enables a system administrator to undertake system administrator functionality via the protection management module 310. Examples of such system administrator functionality include configuring protection switching process variables, facilitating administrator-issued protection switching initiation notifications, and the like. In one example, the system administrator may predict failure (e.g., based on predicted failure alarms) and thereafter issue a protection switching initiation notification, thus notifying the system that a designated card is failing.

While some embodiments of the disclosures set forth herein may be practiced as described above, other embodiments may be used to determine parameters, for example, failure prediction parameters, of protected cards 305, as well as to perform actions based on such parameters. One useful feature implemented in certain embodiments is the ability of a protection card 310 to bridge across datapaths of protected cards 305, such as ports of protected cards 305. When so bridged, a protection card 310 can receive the same data being received by a selected one (or more, if the protection card 310 has sufficient resources) of protected cards 305. The commencement and cessation of such bridging can be performed without disruption of such data and without disruption to the operation of the selected protected card(s) or any other protected cards.

The benefits of the ability for such bridging can be enhanced by using such ability in conjunction with the ability to download service data for a protected card 305 to a protection card 310. By downloading service data to a protection card 310 and bridging the protection card across the datapaths of a selected protected card, the protection card 310 can process the same data, which may include either ingress data, egress data, or both, as the selected protected card according to the same service data. Thus, the data is processed in tandem by both the selected protected card and the protection card 310. One or more switches may be coupled to the outputs of the selected protected card and the protection card 310 to select between such outputs to determine which will serve as a source of data to be propagated to other protected cards or elsewhere in a network coupled to the selected protected card or a network comprising the selected protected card.

Regardless of which of the selected protected card and the protection card 310 is selected to serve as a source of data to be propagated, and even if such one or more switches are not provided at all, a comparator may be coupled to the outputs of the selected protected card and protection card 310 to compare the data at such outputs. Any dissimilarities among the outputs can be identified, allowing observation of internal faults within either of the selected protected card and the protection card 310. An indication of such dissimilarities can be stored and analyzed to allow a more complete understanding of the existence and effects of faults within a protected system.

For example, a history of faults identified while the protection card 310 was bridged across several of protected cards 305 in sequence may be maintained. Such a history allows first results obtained during a first period of time while the protection card 310 was bridged across a first one of the protected cards 305 to be compared against other results obtained during one or more other periods of time while the protection card 310 was bridged across a corresponding one or more of the other protected cards (e.g., a second period of time while the protection card 310 was bridged across a second protected card). Thus, the other results may be used as control samples for comparison of the first results to determine whether anomalies identified in the first results were likely caused by faults of the first protected card or by faults of the protection card. Therefore, on the basis of such comparisons, not only may the reliability of protected cards 305 be analyzed, but also the reliability of protection card 310 may be analyzed.

Moreover, such operations allow failure prediction parameters to be verified before an actual protection switch is performed. For example, if one of the parameters that was used to predict a possible failure were a sharp decrease in traffic in a particular protected card, then the protection card 310 can be bridged across that particular protected card and caused to process the same data streams. Based on the comparative operation of the protection card 310 and that of the particular protected card, failure prediction can be qualified to determine whether it is a false alarm or a valid indication of predicted failure.

If one or more failure prediction parameters indicate that a particular protected card should be replaced by the protection card 310, one or more switches on the outputs of such cards may be used to perform a protection switch, for example substituting the protection card 310 for that particular protected card or vice versa. Since such a protection switch may be performed without disruption of data, such switching may be performed as frequently or infrequently as desired without adversely affecting service.

It should be noted, however, that under some circumstances, it may be desirable to allow the protection card 310 to operate in tandem with a particular protected card for a period of time, which may be referred to as a synchronization period, to allow the operation of the protection card 310 to become as consistent with the operation of the particular protected card as possible. For example, if the particular protected card happens to be processing bursty data, dynamics affecting the addition of data to and the removal of data from the buffers of the particular protected card and the protection card 310 may result in some variation between operation (and consequent outputs) of the particular protected card and the protection card 310. By allowing the synchronization period for any dynamics that might affect the protection card 310 to become stabilized in relation to the particular protected card with which it is configured in tandem, proper operation of that particular protected card and the protection card 310 results in similarity of their outputs, allowing any dissimilarities that may be detected to be interpreted as observations of internal faults.

Faults that may be detected (which have been described as internal faults) included not only faults actually internal to the cards, but also faults that may affect other components specifically dedicated to those particular cards. For example, faults that might occur in card connectors or backplane wiring may also be identified. For example, if dissimilarities of a particular characteristic nature are detected with regard to a particular protected card and also with regard to replacements for that particular protected card, especially if those replacements are known to be in good, working condition, a fault in the card connector or backplane wiring may be identified.

The abilities described above may be used for monitoring all or at least a portion of the protected cards 305. For example, the ability of the protection card 310 to be associated with (e.g., by bridging the datastreams of) particular protected cards without disrupting data allows such association to be performed for those particular protected cards in sequence. As one example, the protection card 310 can be configured to process the data for each of several protected cards in a sequence, such as a round-robin fashion. Such sequencing is useful, for example, if no particular protected card is exhibiting symptoms of distress (e.g., if none of the protected cards 305 have failure prediction parameters breaching failure prediction parameter threshold limits). In such a case, no likelihood of imminent failure has been detected, so there is no indication for a protection card 310 to be associated specifically with a particular protected card based on a need to provide protection for that particular protected card from predicted imminent failure. Thus, the protection card 310 is free to be configured in tandem with the any (or all) of the protected cards 305 in sequence. Information that may be obtained in such a configuration may include evidence of very infrequent and/or very subtle faults that might not otherwise be detected. Moreover, by comparing the information obtained from association of the protection card 310 among the several protected cards, anomalies that exhibit some degree of consistency across all of the several protected cards may be inferred to result from one or more faults in the protection card 310. Thus, monitoring, failure prediction, and failure detection of the protection card 310 can also be provided.

Alternatively, if evidence of potential faults were correlated with one or more of the protected cards 305, a likelihood of failure may be inferred with respect to those one or more protected cards 305. Also, failure prediction parameters may be compared between the protection card 310 and one or more of protected cards 305. Evidence of one or more difference between the failure prediction parameters of the protection card 310 and those of the one or more protected cards 305 may be inferred to indicate a likelihood of failure.

In the preceding detailed description, reference has been made to the accompanying drawings that form a part hereof, and in which are shown by way of illustration specific embodiments in which the invention may be practiced. These embodiments have been described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description omits certain information known to those of skill in the art. The preceding detailed description is, therefore, not to be taken in a limiting sense, and the scope of the present invention is defined only by the appended claims.

What is claimed is:

1. A method of facilitating protection switching to enhance performance of a network system, comprising:

identifying a failure predicted one of a plurality of protected system elements, wherein identifying the failure predicted one of said protected system elements includes assessing performance of said protected system elements based at least partially on an element demerit point level of each one of said protected system elements and at least partially on a protection switching priority for at least a portion of said protected system elements;

determining that a protection switching priority among a collection of failure predicted system elements applies to the failure predicted one of said protected system elements;

downloading service information of the failure predicted one of said protected system elements to a protection system element after the determining that the protection switching priority applies to the failure predicted one of said protected system elements; and implementing a protection switching operation for switching designated information from the failure predicted one of said protected system elements to the protection system element.

2. The method of claim 1 wherein identifying the failure predicted one of said protected system elements includes assessing at least one of a plurality of failure prediction parameters of said protected system elements for determining when a failure prediction condition has been met by one of said protected system elements.

3. The method of claim 1 wherein identifying the failure predicted one of said protected system elements includes:
   monitoring a failure prediction parameter of at least one of the plurality of protected system elements; and
   correlating a present state of the failure prediction parameter to a failure prediction criterion for determining whether the failure prediction parameter has met a failure prediction condition.

4. The method of claim 3 wherein monitoring the failure prediction parameter includes monitoring an element demerit point value, a rate of change of the element demerit point value, an element demerit point value threshold limit, a number of active connections, a number of active service subscribers, a performance value specified in a respective service agreement a data bit rate and a rate of change of the data bit rate.

5. The method of claim 3 wherein the monitoring the failure prediction parameter further comprises bridging the protection system element across the at least one of the plurality of the protected system elements.

6. The method of claim 3 wherein the monitoring the failure prediction parameter further comprises sequentially bridging the protection system element across each of the plurality of the protected system elements.

7. The method of claim 6 wherein correlating the present state of the failure prediction parameter to the failure prediction criterion further comprises correlating when anomalies in the failure prediction parameter are consistent across the plurality of the protected system elements.

8. The method of claim 7 further comprising the step of:
   when the anomalies in the failure prediction parameter are consistent across the plurality of the protected system elements, inferring a fault in the protection system element.

9. The method of claim 1 wherein assessing performance of said protected system elements includes determining when an element demerit point level of one of said protected system elements has exceeded a predetermined element demerit point threshold limit.

10. The method of claim 9 wherein the predetermined element demerit point threshold limit is associated with a first level of failure probability, lower than an element demerit point threshold limit corresponding to a next higher level of failure probability.

11. The method of claim 1 wherein the element demerit point level corresponds to a quantity of element demerit points accumulated over a designated period of time.

12. The method of claim 1 wherein identifying the failure predicted one of said protected system elements includes determining that a rate of change of element demerit points for one of said protected system elements has exceeded a predetermined element demerit point rate of change threshold limit.

13. The method of claim 1 wherein identifying the failure predicted one of said protected system elements includes determining that a failure prediction parameter corresponding to a service agreement parameter for one of said protected system elements has declined to a predetermined minimal acceptable service agreement parameter level.

14. The method of claim 1, further comprising:
   determining that a protection switching priority among a collection of failure predicted system elements applies to the failure predicted one of said protected system elements.

15. The method of claim 14 wherein implementing the protection switching operation is initiated after determining that the protection switching priority applies to the failure predicted one of said protected system elements.

16. The method of claim 14 wherein determining that the protection switching priority applies to the failure predicted one of said protected system elements includes assessing a protection switching priority parameter for each system element of the collection of failure predicted system elements.

17. The method of claim 16 wherein assessing the protection switching parameter includes assessing at least one of a parameter relating to element demerit points, a parameter relating to a rate of change of said element demerit points, a parameter relating to an element demerit point threshold limit, a parameter relating to a number of active connections, a parameter relating to a number of active service subscribers, a parameter designated in a service agreement, a mounted position in a network element, an administrator-assigned priority value, a data bit rate and a rate of change of the data bit rate.

18. The method of claim 1, wherein implementing the protection switching operation includes:
   confirming failure of the first failure predicted one of said protected system elements; and
   switching communication service supported by the failure predicted one of said protected system elements for being supported by to the protection system element after confirming said failure.

19. The method of claim 18 wherein determining that the protection switching priority applies to the failure predicted one of said protected system elements includes assessing a protection switching priority parameter for the collection of failure predicted system elements.

20. The method of claim 19 wherein assessing the protection switching parameter includes assessing at least one of a parameter relating to element demerit points, a parameter relating to a rate of change of said element demerit points, a parameter relating to an element demerit point threshold limit, a parameter relating to a number of active connections, a parameter relating to a number of active service subscribers, a parameter designated in a service agreement, a mounted position in a network element, an administrator-assigned priority value, a data bit rate and a rate of change of the data bit rate.

21. The method of claim 18 wherein the protection system element provides protection switching functionality exclusively for all of said protected system elements.

22. The method of claim 18 wherein:
   identifying the failure predicted one of said protected system elements includes determining that a failure prediction parameter associated with the failure predicted one of said protected system elements has exceeded a failure prediction parameter first threshold limit; and
   said switching communication service is initiated in response to the failure prediction parameter exceeding a failure prediction parameter second threshold limit different than the failure prediction parameter first threshold limit.

23. The method of claim 22 wherein the failure prediction first threshold limit is associated with a first level of failure probability and the failure prediction second threshold limit is associated with a second level of failure probability higher than the first level of failure probability.

24. The method of claim 18 wherein:
identifying the failure predicted one of said protected system elements includes determining that a failure prediction parameter associated with the failure predicted one of said protected system elements has exceeded a failure prediction parameter first threshold limit; and
confirming failure includes determining that the failure prediction parameter has exceeded a failure prediction parameter second threshold limit different than the failure prediction parameter first threshold limit.

25. The method of claim 1, wherein identifying the failure predicted one of said protected system elements includes determining that a failure prediction parameter associated with the failure predicted one of said protected system elements has exceeded a failure prediction parameter first threshold limit.

26. The method of claim 25 wherein implementing said protection switching operation is performed in response to determining that the failure prediction parameter has exceeded a failure prediction parameter second threshold limit different than the failure prediction parameter first threshold limit.

27. The method of claim 1 wherein the protection system element provides protection switching functionality exclusively for all of said protected system elements.

28. The method of claim 1, further comprising:
configuring protection switching variables associated with the protection switching operation.

29. The method of claim 28 wherein configuring said protection switching variables includes:
associating each one of said protected system elements with the protection system element; and
specifying failure prediction criterion for each of said protected system elements.

30. The method of claim 29 wherein specifying said failure prediction criterion includes specifying a first type of failure prediction criterion for a first portion of said protected system elements and a second type of failure prediction criterion for a second portion of said protected system elements.

31. The method of claim 29 wherein specifying said failure prediction criterion includes specifying said failure prediction criterion on a per protected system element basis.

32. The method of claim 29 wherein implementing the protection switching operation includes:
downloading service information of the failure predicted one of said protected system elements to the protection system element after identifying the failure predicted one of said protected system elements; and
switching communication service supported by said failure predicted one of said protected system elements for being supported by to the protection system element after downloading said service information but before an actual failure.

33. The method of claim 1 wherein identifying the failure predicted one of said protected system elements includes assessing a protection switching operation initiation notification issued via a system administrator user interface.

34. A method of facilitating protection switching to enhance performance of a network system, comprising:
monitoring a failure prediction parameter of at least one of the plurality of protected system elements;
correlating a present state of the failure prediction parameter to a failure prediction criterion for determining whether one of said protected system elements has met a failure prediction condition, thereby identifying a failure predicted one of a plurality of protected system elements when the failure prediction condition is met;
determining that a protection switching priority among a collection of failure predicted system elements applies to the failure predicted one of said protected system elements;
downloading service information of the failure predicted one of said protected system elements to the protection system element after identifying the failure predicted one of said protected system elements, wherein downloading said service information is performed after determining that the protection switching priority applies to the failure predicted one of said protected system elements;
confirming failure of the failure predicted one of said protected system elements; and
switching communication service supported by the failure predicted one of said protected system elements for being supported by to the protection system element after confirming said failure.

35. The method of claim 34 wherein correlating includes determining that an element demerit point level of one of said protected system elements has exceeded a predetermined element demerit point threshold limit.

36. The method of claim 35 wherein the predetermined element demerit point threshold limit is associated with a first level of failure probability, lower than an element demerit point threshold limit corresponding to a next higher level of failure probability.

37. The method of claim 35 wherein the element demerit point level corresponds to a quantity of element demerit points accumulated over a designated period of time.

38. The method of claim 34 wherein correlating includes determining that a rate of change of element demerit points for one of said protected system elements has exceeded a predetermined element demerit point rate of change threshold limit.

39. The method of claim 34 wherein correlating includes determining that the failure prediction parameter corresponding to a service agreement parameter for one of said protected system elements has declined to a predetermined minimal acceptable service agreement parameter level.

40. The method of claim 34 wherein determining that the protection switching priority applies to the failure predicted one of said protected system elements includes assessing at least one of a parameter relating to element demerit points, a parameter relating to a rate of change of said element demerit points, a parameter relating to an element demerit point threshold limit, a parameter relating to a number of active connections, a parameter relating to a number of active service subscribers, a parameter designated in a service agreement, a mounted position in a network element, an administrator-assigned priority value, a data bit rate and a rate of change of the data bit rate.

41. The method of claim 34 wherein the protection system element provides protection switching functionality exclusively for all of said protected system elements.

42. A method of facilitating protection switching, comprising:
facilitating a protection switching configuration operation wherein a failure prediction condition for at least a portion of a plurality of protected system elements is defined;
facilitating a failure confirmed protection switching operation in response to identifying that the failure prediction condition for one of said protected system elements has been met during operation of said protected system elements;

facilitating an administrator-initiated protection switching operation in response to receiving, at a system administrator user interface of a protected system comprising the plurality of protected system elements, an administrator-issued protection switching initiation notification;

specifying a protection switching priority for at least a portion of said protected system elements;

determining that the protection switching priority among a collection of failure predicted system elements applies to the one of said protected system elements prior to facilitating the failure confirmed protection switching operation; and downloading service information of the one of said protected system elements after the determining that the protection switching priority among the collection of said failure predicted system elements applies to the one of said protected system elements.

43. The method of claim 42 wherein facilitating the protection switching configuration operation includes:
associating each one of said protected system elements with the protection system element; and
specifying failure prediction criterion for each of said protected system elements.

44. The method of claim 43 wherein specifying said failure prediction criterion includes specifying a first type of failure prediction criterion for a first portion of said protected system elements and a second type of failure prediction criterion for a second portion of said protected system elements.

45. The method of claim 44 wherein specifying said failure prediction criterion includes specifying said failure prediction criterion on a per protected system element basis.

46. The method of claim 42 wherein facilitating the failure confirmed protection switching operation includes:
downloading service information of the failure predicted one of said protected system elements to the protection system element after identifying the failure predicted one of said protected system elements;
confirming failure of the first failure predicted one of said protected system elements; and
switching communication service supported by the failure predicted one of said protected system elements for being supported by to the protection system element after confirming said failure.

47. The method of claim 46, further comprising:
determining that a protection switching priority among a collection of failure predicted system elements applies to the failure predicted one of said protected system elements prior to downloading said service information.

48. The method of claim 42 wherein:
identifying the failure predicted one of said protected system elements includes determining that a failure prediction parameter associated with the failure predicted one of said protected system elements has exceeded a failure prediction parameter first threshold limit; and
confirming failure includes determining that the failure prediction parameter has exceeded a failure prediction parameter second threshold limit different than the failure prediction parameter first threshold limit.

49. An apparatus capable of facilitating protection switching, comprising:
a plurality of protected system elements;
a protection system element including a data processor and capable of providing protection switching functionality for at least one of said protected system elements; and
a data processor program, wherein the data processor program is capable of enabling the protection system element to facilitate identifying a failure predicted one of said protected system elements, wherein identifying the failure predicted one of said protected system elements includes determining that a rate of change of element demerit points for one of said protected system elements has exceeded a predetermined element demerit point rate of change threshold limit, determining that a protection switching priority among a collection of failure predicted system elements applies to the failure predicted one of said protected system elements, downloading service information of the failure predicted one of said protected system elements to the protection system element after the determining that the protection switching priority applies to the failure predicted one of said protected system elements, and implementing a protection switching operation for switching designated information from the failure predicted one of said protected system elements to the protection system element.

50. A data processor program product, comprising:
a data processor program processable by a data processor; and
an apparatus from which the data processor program is accessible by the data processor; wherein
the data processor program is capable of enabling the data processor to facilitate:
monitoring a failure prediction parameter of at least one of the plurality of protected system elements;
correlating a present state of the failure prediction parameter to a failure prediction criterion for determining whether one of said protected system elements has met a failure prediction condition, thereby identifying a failure predicted one of a plurality of protected system elements when the failure prediction condition is met;
downloading service information of the failure predicted one of said protected system elements to a protection system element after identifying the failure predicted one of said protected system elements;
confirming failure of the failure predicted one of said protected system elements; and
switching communication service supported by the failure predicted one of said protected system elements for being supported by to the protection system element after confirming said failure, wherein the correlating the present state of the failure prediction parameter to the failure prediction criterion further comprises:
correlating when anomalies in the failure prediction parameter are consistent across the plurality of protected system elements; and
when the anomalies in the failure prediction parameter are consistent across the plurality of the protected system elements, inferring a fault in the protection system element.

* * * * *